United States Patent
Ng

(10) Patent No.: US 11,720,865 B2
(45) Date of Patent: Aug. 8, 2023

(54) SYSTEMS AND METHODS FOR DISTRIBUTED ELECTRONIC PAYMENT PROCESSING USING HIERARCHICAL PAYMENT GRAPH

(71) Applicant: WePay, Inc., Redwood City, CA (US)

(72) Inventor: Raymond Ng, Palo Alto, CA (US)

(73) Assignee: WePay, Inc., Redwood City, CA (US)

( * ) Notice: Subject to any disclaimer, the term of this patent is extended or adjusted under 35 U.S.C. 154(b) by 372 days.

(21) Appl. No.: 15/745,680

(22) PCT Filed: Jan. 12, 2018

(86) PCT No.: PCT/US2018/013649
§ 371 (c)(1),
(2) Date: Jan. 17, 2018

(87) PCT Pub. No.: WO2018/217239
PCT Pub. Date: Nov. 29, 2018

(65) Prior Publication Data
US 2019/0392408 A1 Dec. 26, 2019

Related U.S. Application Data

(60) Provisional application No. 62/510,212, filed on May 23, 2017.

(51) Int. Cl.
*G06Q 20/08* (2012.01)
*G06F 16/901* (2019.01)

(52) U.S. Cl.
CPC ....... *G06Q 20/085* (2013.01); *G06F 16/9024* (2019.01)

(58) Field of Classification Search
CPC .... G06Q 20/085; G06Q 20/227; G06Q 40/02; G06F 16/9024; H04L 12/24; H04L 29/08
(Continued)

(56) References Cited

U.S. PATENT DOCUMENTS

2010/0114586 A1 5/2010 Barros et al.
2010/0174694 A1* 7/2010 Staebler .............. G06F 16/2358
707/703

(Continued)

FOREIGN PATENT DOCUMENTS

JP 2002-298059 A 10/2002
WO 2010-056651 A1 5/2010
WO WO-2013149381 A1 * 10/2013 .......... G06F 11/1451

OTHER PUBLICATIONS

PCT International Search Report and Written Opinion dated May 2, 2018 in International Application No. PCT/US18/13649. 9 pages.
(Continued)

*Primary Examiner* — Gregory S Cunningham, II
(74) *Attorney, Agent, or Firm* — Morgan, Lewis & Bockius LLP; Manita Rawat

(57) ABSTRACT

A new approach is proposed that contemplates systems and methods to support distributed electronic payment processing based on a hierarchical payment graph. Specifically, a distributed electronic payment system comprising a plurality of distributed payment engines/processors. Upon receiving an electronic payment request from a client device, each distributed payment engine of the distributed electronic payment system is configured to handle one stage of the electronic payment processing lifecycle by traversing states and edges in a portion of the hierarchical payment graph assigned to the distributed payment engine. While processing the electronic payment, the distributed payment engine of each sub-graph of the hierarchical payment graph is configured to communicate with a payment engine of a main payment graph of the hierarchical payment graph, wherein such inter-graph communication is modeled or typed via an (Continued)

extended graph definition language (GDL), which declaratively defines a plurality of types of electronic payment processing.

22 Claims, 5 Drawing Sheets

(58) Field of Classification Search
USPC .......................................................... 705/39
See application file for complete search history.

(56) References Cited

U.S. PATENT DOCUMENTS

| 2011/0197207 | A1 | 8/2011 | Bhargava |
| 2012/0226670 | A1 | 9/2012 | Arcushin et al. |
| 2016/0034883 | A1 | 2/2016 | Amos et al. |
| 2016/0072676 | A1* | 3/2016 | Gomadam .......... H04L 41/5045 709/221 |
| 2018/0239959 | A1* | 8/2018 | Bui ........................ G06Q 10/10 |

OTHER PUBLICATIONS

The International Bureau of WIPO, International Preliminary Report on Patentability issued in PCT/US2018/013649, dated Nov. 26, 2019, 5 pages.
The International Bureau of WIPO, International Preliminary Report on Patentability issued in PCT/US2016/046814, dated Jan. 29, 2019, 10 pages.
Korean Intellectual Property Office, International Search Report issued in PCT/US2016/046814, dated Apr. 26, 2017, 3 pages.
Korean Intellectual Property Office, Written Opinion of the International Searching Authority issued in PCT/US2016/046814, dated Apr. 26, 2017, 9 pages.

* cited by examiner

SYSTEMS AND METHODS FOR DISTRIBUTED ELECTRONIC PAYMENT PROCESSING USING HIERARCHICAL PAYMENT GRAPH

CROSS-REFERENCE TO RELATED AND CO-PENDING APPLICATIONS

This application is a U.S. national stage application under § 317 of International Patent Application No. PCT/US18/13649, filed Jan. 12, 2018, which claims the benefit of U.S. Provisional Patent Application No. 62/510,212, filed May 27, 2017, and entitled "Payment system using distributed hierarchical graph," the enterties of each are expressly incorporated herein in its entirety by reference.

This application is related to International Patent Application No. PCT/US16/46814, filed Aug. 12, 2016, and entitled "Systems and methods for electronic payment processing based on typed graph of payment lifecycle," which is incorporated herein in its entirety by reference.

BACKGROUND

A payment is a monetary or financial transaction (or simply transaction) that moves money from a source (src) account to a destination (dst) account. For a non-limiting example, one common form of payment is credit card payment. An electronic payment submitted via, for non-limiting examples, a stripe credit card, an EMV smart card, e-check, etc., typically goes through a number of payment states/phases/stages in its payment lifecycle. The following is a simplified linear state transition diagram for a traditional ('stripe') credit card payment:
NEW=>AUTHORIZED=>CAPTURED In order to handle various payment technologies (e.g., EMV), business rules (e.g., Reviews), use cases (e.g., Cancelation, Refunds, Chargebacks, Recurring, etc.) and error conditions (e.g., integrator issues, timeouts, retries, etc.) involved in processing the electronic payment, the state transition diagram can become complex very quickly. The following table is a partial summary of an example of implementation of the state transitions involved in a simple credit card payment:

| Payment | Authorization | Review |
| --- | --- | --- |
| New | New | |
| Authorizing | Running | |
| | Authorized | |
| Authorized | | |
| | | New |
| AuthProcessed | | |
| | | Analyzing |
| | | In Review |
| | | Passed |
| Started | | |
| | Captured | |
| Captured | | |

As shown by the table above, the Payment, Authorization and Review states are all implemented as (linearly) stateful objects. Some current approaches adopt a payment graph to represent/model the various states, stages, and transitions that an electronic payment goes through in a payment cycle before the electronic payment can be considered "captured." In a localized monolithic system that handles one single electronic payment at a time, the payment graph can be implemented entirely in a single entity/process without requiring any coordination amongst a plurality of distributed electronic payment processing peers. Most electronic payment systems developed today, however, utilize a distributed architecture for its scalability, high-throughput, low-latency, robustness, ease of maintenance, etc., where various micro financial services collaborate together as a unit. It is thus desirable to enable a graph-based electronic payment system that can represent and model an electronic payment cycle under such distributed architecture.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
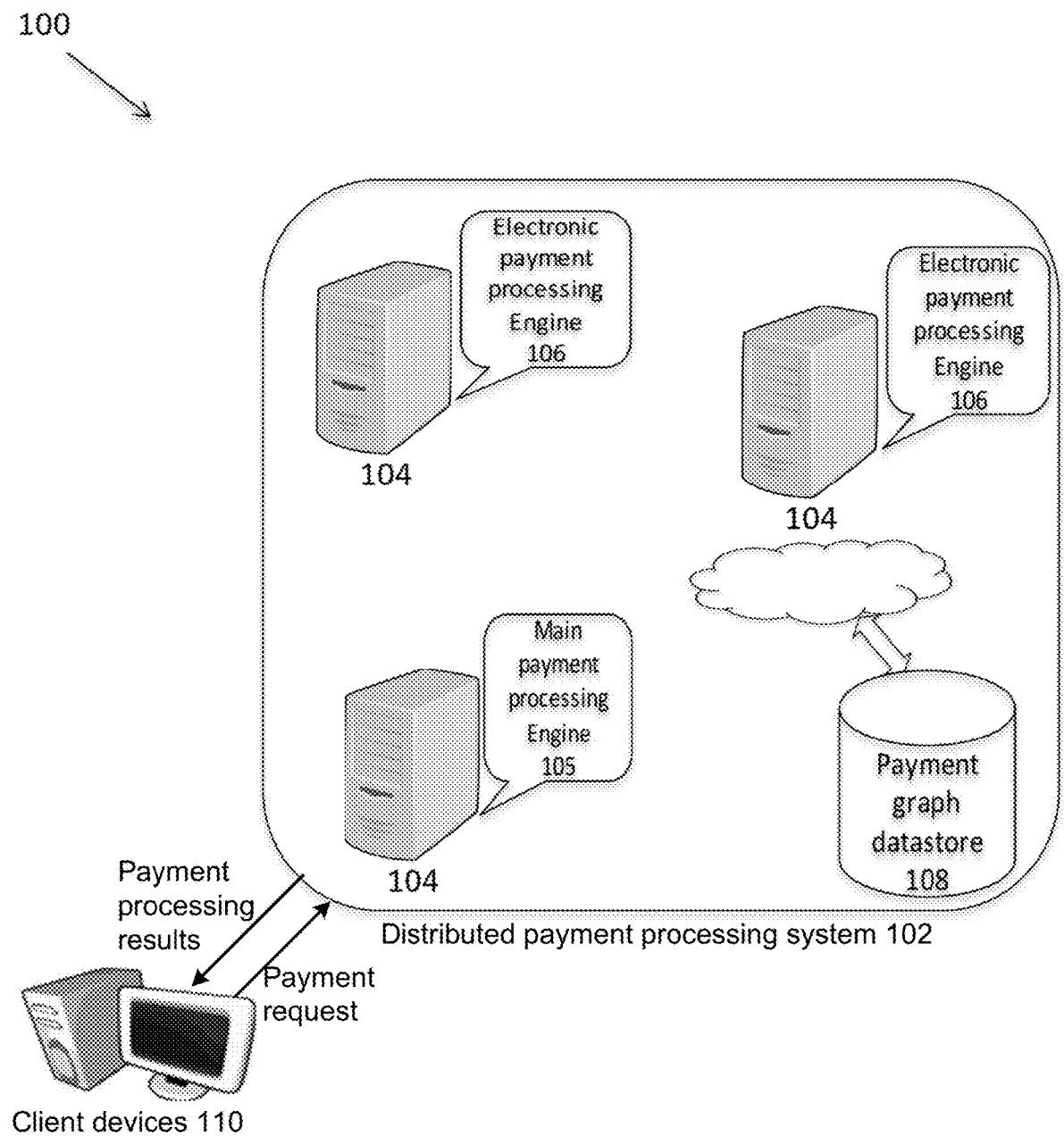
FIG. 1 depicts an example of a diagram of a system to support distributed electronic payment processing in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support distributed electronic payment processing based on a hierarchical payment graph. Specifically, a distributed electronic payment system comprising a plurality of distributed payment engines/processors. Upon receiving an electronic payment request from a client device, each distributed payment engine of the distributed electronic payment system is configured to handle one stage of the electronic payment processing lifecycle by traversing states and edges in a portion of the hierarchical payment graph assigned to the distributed payment engine. While processing the electronic payment, the distributed payment engine of each sub-graph of the hierarchical payment graph is configured to communicate with a payment engine of a main payment graph of the hierarchical payment graph, wherein such inter-graph communication is modeled or typed via an extended graph definition language (GDL), which declaratively defines a plurality of types of electronic payment processing.

Under the proposed graph-based and strongly-typed approach to distributed electronic payment processing, only well-defined/typed transitions between payment states are allowed at each stage during processing of an electronic payment, wherein the electronic payment is transitioned from one stage to another in its payment lifecycle among the processing engines of the distributed payment system without any ambiguities or errors. The declaratively defined hierarchical payment graph supports early phase (pre-production) analysis whereby different processing engines that are geographically distributed and could fail independently can coordinate amongst one another to properly keep track of the current state of the electronic payment processing.

FIG. 1 depicts an example of a diagram of a system 100 to support distributed electronic payment processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a distributed payment processing system 102 comprising a main payment processing engine/processor 105, a plurality of electronic payment processors/processing units/engines 106 and a payment graph datastore 108, each running on a computing unit/appliance/host 104 located at distributed geographical locations, with software instructions stored in a storage unit such as a non-volatile memory (also referred to as secondary memory) of the host 104 for practicing one or more processes. When the software instructions are executed, at least a subset of the software instructions is loaded into memory (also referred to as primary memory) by the host 104, which becomes a special purposed one for practicing the processes. The processes may also be at least partially embodied in the host 104 into which computer program code is loaded and/or executed, such that, the host 104 becomes a special purpose computing unit for practicing the processes. When implemented on a general-purpose computing unit, the computer program code segments configure the host 104 to create specific logic circuits.

In the example of FIG. 1, each host 104 can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems. In some embodiments, each host 104 has a communication interface (not shown), which enables the main payment processing engine 105, the electronic payment processing engines 106 and/or the payment graph datastore 108 running on the hosts 104 to communicate with each other and/or client devices 110 following certain communication protocols, such as TCP/IP, http, https, ftp, and sftp protocols, over one or more communication networks (not shown).

In the example of FIG. 1, the client devices 110 are utilized by clients to initiate electronic payment requests to the distributed payment processing system 102, wherein the client devices reside either locally or remotely (e.g., in a cloud) from the distributed payment processing system 102. Here, the client devices 110 include but are not limited to, mobile/hand-held devices such as tablets, iPhones, iPads, Google's Android devices, and/or other types of mobile communication devices, PCs, such as laptop PCs and desktop PCs, and server machines. The communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Figure 2:
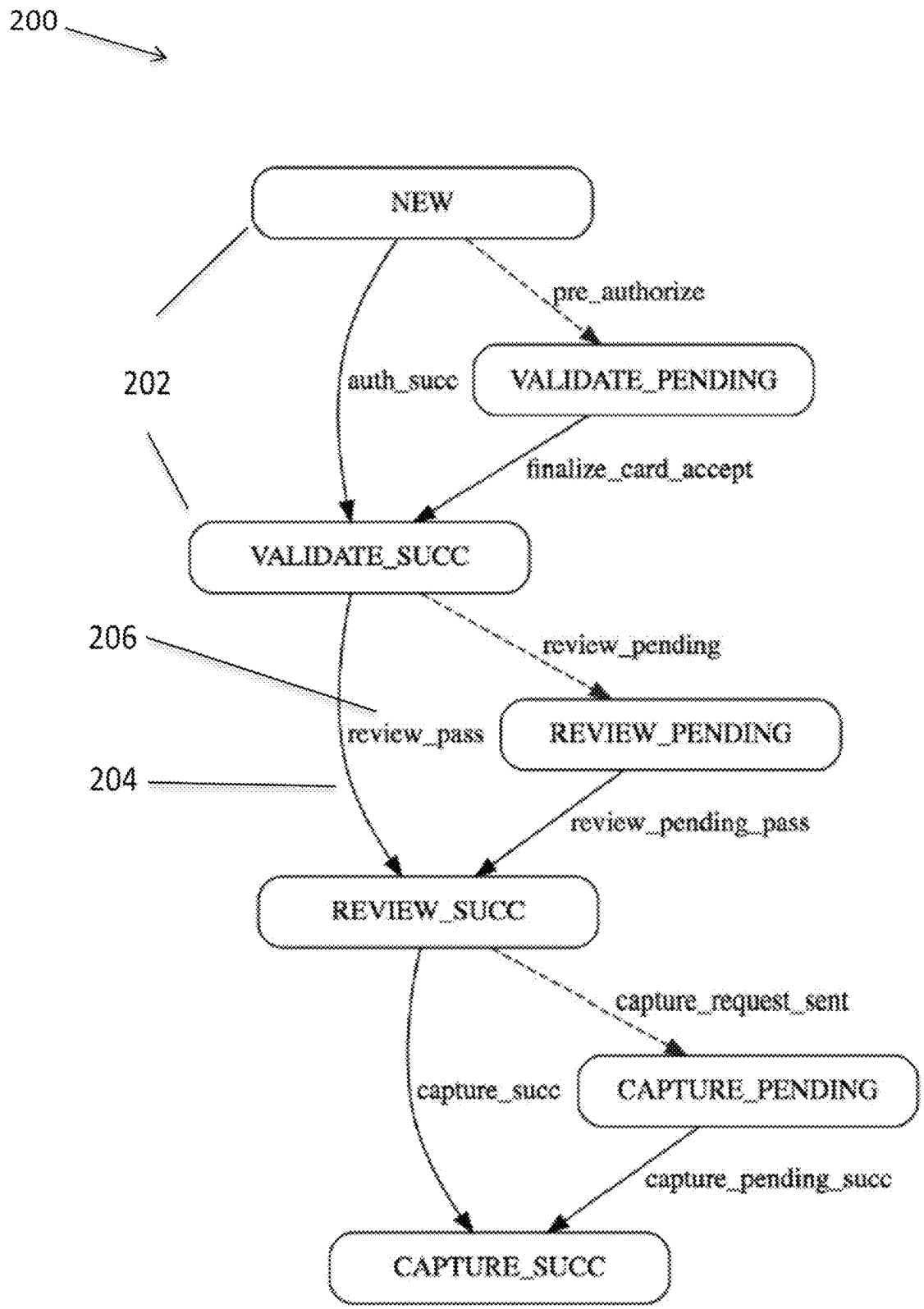
FIG. 2 depicts a non-limiting example of a credit card payment graph used for automated electronic payment processing in accordance with some embodiments.

In the example of FIG. 1, the distributed payment processing system 102 is configured to utilize each of the main payment processing engine 105 and the electronic payment processing engines 106 for various types of electronic payment processing. Here, the types of the electronic payment processing as represented by the hierarchical payment graph include but are not limited to, credit card, ACH, EMV, etc. A credit card payment lifecycle is a multi-stage process, which is modeled as a payment graph. FIG. 2 depicts a non-limiting example of a credit card payment graph 200, which captures the various stages that a credit card payment needs to go through before it can be considered captured successfully. As shown in the example of FIG. 2, the credit card payment graph 200 is a directed graph having a collection of nodes/vertices (V) 202, directed edges (E) 204, and attributes (A) 206, which are payloads associated with the edges. The vertices 202 of the payment graph 200 represent a plurality of payment states in the lifecycle of the electronic payment and the edges 204 of the payment graph represent valid transitions between the payment states during the payment lifecycle. A path from one vertex (payment state A) to another (payment state B) includes a plurality of vertices 202 connected by directed edges 204 in the payment graph 200, wherein the path represents an audit trail of the lifecycle of the electronic payment that includes different types of attributes (payloads) recorded along the path for risk analysis.

In some embodiments, the payment graph 200 is also a well-defined/typed graph, wherein each of the vertices 202, edges 204, and the attributes 206 associated with the edges are explicitly and declaratively defined (or "typed") by the distributed payment processing system 102 via a schema to be of certain types, which are names/identifications of the entities used to prevent errors during electronic payment processing. The collection of the entities (V/E/A) in the typed payment graph represents the schema (S) of the typed payment graph. Defining (or typing) entities of the payment graph 200 is important since it allows the distributed payment processing system 102 to definitely differentiate between the multiple edges that connect a same pair of vertices without ambiguity. Additionally, typed vertices, edges and attributes together support automatic type checking at compile time of the typed payment graph for type safety, which a "label" (typically represented as String type) is not sufficient to achieve.

The typed payment graph results in a robust implementation of the electronic payment process, which fully supports machine readable and type-checked audit trails. For a non-limiting example, an electronic payment may be canceled by the client or due to a timeout. The electronic payment may also be rejected by the distributed electronic payment system 102 or by an in-house risk team. When this happens, typing is a robust way to re-construct the complete audit trail of such canceled or rejected payment. In addition, strong typing of not only the vertices and edges, but also the attributes of the edges in the payment graph, allows the payment processing engine to differentiate between different transitions/edges starting and ending at the same states/vertices but having different attributes and the guide the processing of the electronic payment accordingly through its payment lifecycle. Since the allowable transitions between the payment states in the typed payment graph are defined declaratively and checked before run time, the proposed approach avoids possible runtime error due to corrupted data.

In some embodiments, the types of entities (V/E/A) in a payment graph are defined declaratively either via an extended graph definition language (GDL) or via a language specific construct (e.g. a class declaration). Under such payment graph definition, it is only possible to transition from one vertex/payment state to another if there being an explicit edge between the vertices, which guarantees the payment graph is well-formed and the electronic payment will not get stuck during processing. In some embodiments, the distributed payment processing system 102 is configured to perform automatic static type checking of the payment graph both at the GDL level when the GDL code is compiled to define the payment graph and at runtime when the software program code is generated from the GDL code to process the electronic payment. Potential errors can be caught at both the development phase of the payment graph and prior to its deployment for electronic payment processing.

Once the payment graphs are defined, they are persisted (stored) in the payment graph datastore 108 for payment processing by the distributed payment processing system 102. In the example of FIG. 1, payment graph datastore 108 is configured to maintain/persist various instances of payment graphs including all of its entities (V/E/A) and types. In some embodiments, unlike a relational database that is based on relational tables, the payment graph datastore 108 is optimized for graphs and supports graph-based queries to the payment graphs stored in it to achieve a highly scalable and robust distributed electronic payment processing system 102. Specifically, the payment graph datastore 108 is configured to support at least the following:

CRUD (Create, Read, Update and Delete) operations on the payment graph and its entities—vertices, edges, attributes, and paths;

Query operations based on types of the vertices, edges, attributes, and paths of the payment graph.

Since the distributed payment processing system 102 comprises the main payment processing engine 105 and a plurality of electronic payment processing engines 106 located at geographically distributed locations, such distributed payment processing system is inherently more complex than a localized monolithic system from a system's perspective even if each individual payment processing engine in the distributed payment processing system 102 may be simpler and easier to maintain. To ensure that the distributed payment processing system 102 can be implemented reliably and correctly in a distributed environment, a declaratively defined main/parent/hierarchical payment graph 300 comprising a main payment graph 302 and a plurality of payment sub-graphs 304 associated with the electronic payment processing engines is adopted to manage the inherent complexities that come with a distributed design. A parent-child relationship is maintained between the main payment graph 302 and the various payment sub-graphs 304 of the hierarchical payment graph 300. In some embodiments, each stage of the payment processing lifecycle is modeled by a stage-specific payment sub-graph, which is utilized by one of the electronic payment processing engines 106 to implement/process the specific stage of the payment process. Such a distributed hierarchical graph model is not only useful in ensuring robust, correct state transitions during payment processing by the distributed payment processing system 102, it also plays a critical role in defining the runtime behaviors of various payment processing engines 106 collaborating to function as a whole in the distributed payment processing system 102.

Figure 3A:
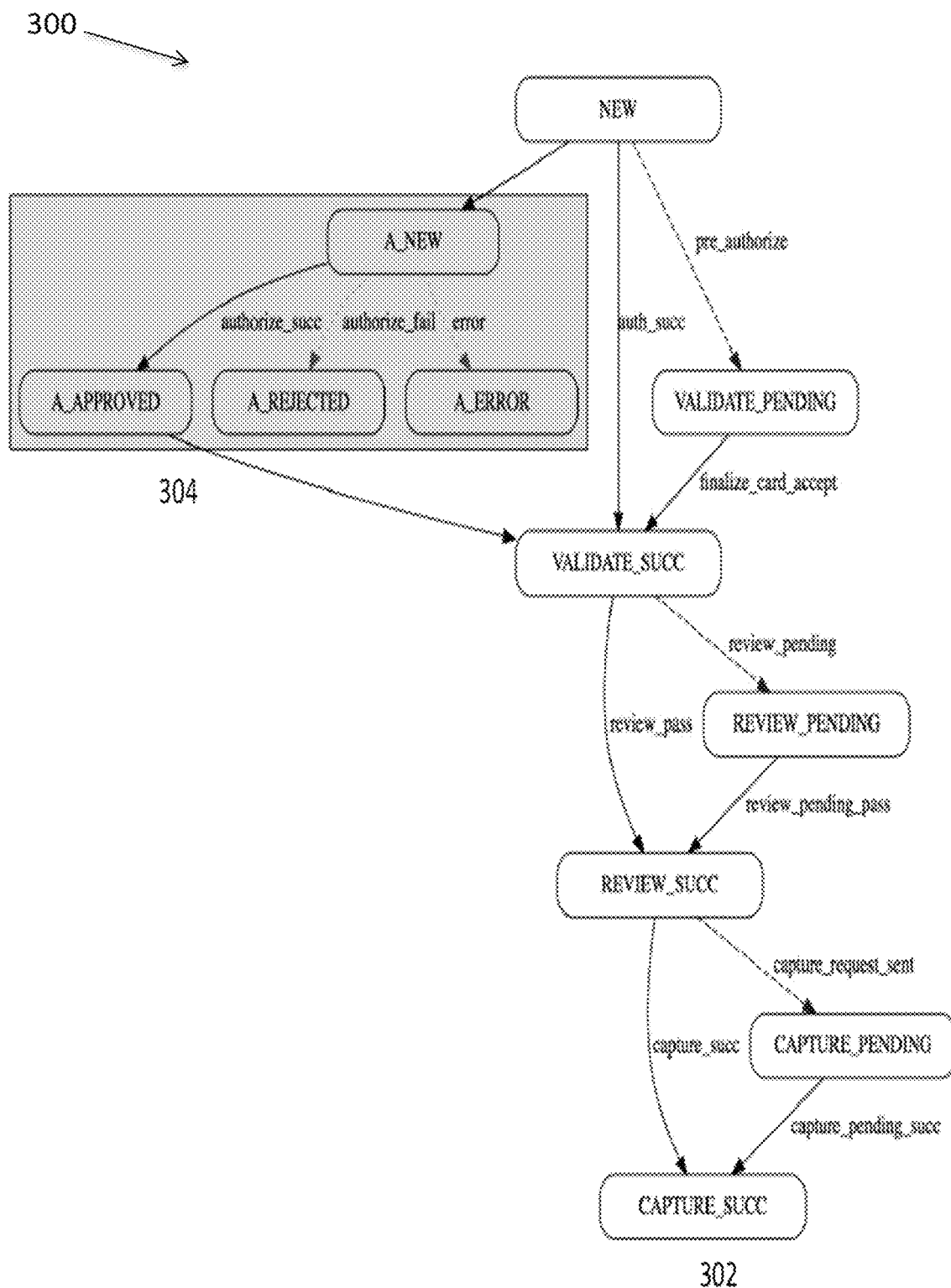
FIG. 3A depicts an example of a hierarchical payment graph expanded from the example of the payment graph depicted in FIG. 2 in accordance with some embodiments.
Figure 3B:
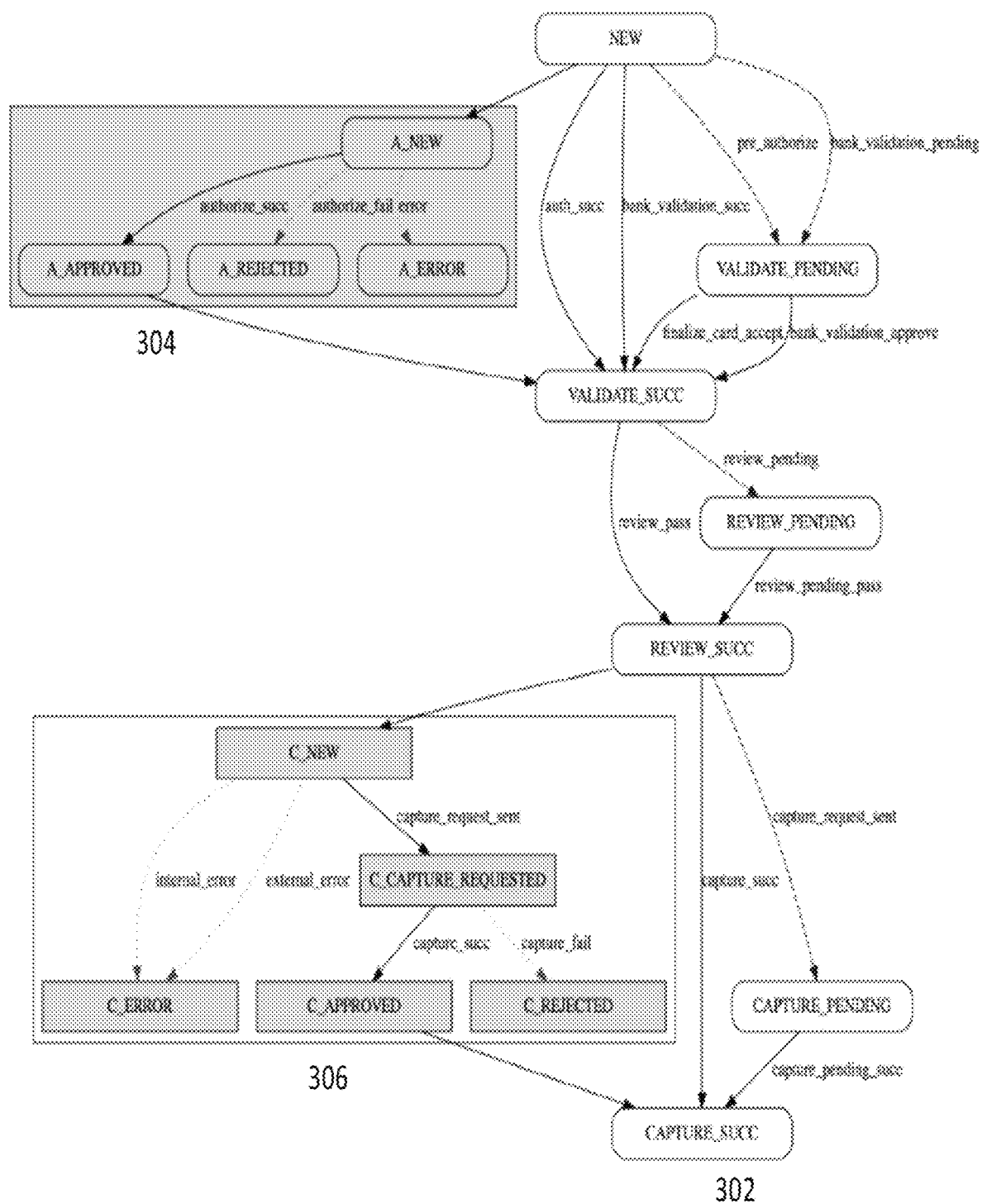
FIG. 3B depicts an example of a hierarchical payment graph, which is further expanded from the example of FIG. 3A in accordance with some embodiments.

FIG. 3A depicts an example of a hierarchical payment graph 300 expanded from the example of the payment graph 200 depicted in FIG. 2. In the example of FIG. 3A, an additional "authorization" phase/stage is modeled as a payment sub-graph 304 in addition to the main payment graph 302. The authorization stage can be handled by an electronic payment processing engine 106, which is separated and independent from the payment processing engine handling the main payment graph 302 as discussed in details below. FIG. 3B depicts an example of a hierarchical payment graph 300, which is further expanded from the example of FIG. 3A to include an additional capture "stage" similarly modeled as a payment sub-graph 306, wherein the executed payment sub-graph 306 can be executed at runtime via an electronic payment processing engine 106 that specializes in execution of that stage as discussed below.

In some embodiments, the main payment processing engine/processor 105 is configured to manage the payment process based on the main payment graph instead of the payment sub-graph, while the rest of the electronic payment processing engines 106 each focuses on execution of a specific stage of the payment processing lifecycle based on a specific payment sub-graph. For non-limiting examples, the sub-graph 304 for the authorization stage and the sub-graph 306 for the capture stage shown in FIGS. 3A-3B can be utilized by different electronic payment processing engines 106 configured to authorize and capture an electronic payment, respectively. In some embodiments, the main payment processing engine 105 may or may not be geographically co-located with the electronic payment processing engines 106. In some embodiments, the main payment graph is decoupled from details of the state transitions and error handling of the electronic payment processing, which are covered by the stage-specific payment sub-graphs. Under such scenario, each electronic payment processing engine in the distributed payment processing system 102 is associated with and utilizes either the main payment graph or one of the payment sub-graphs, wherein the main payment processing engine 105 focuses on managing and coordinating the end-to-end payment processing lifecycle while leaving the stage-specific details to the electronic payment processing engines 106.

In some embodiments, an electronic payment processing engine/processor 106 in the distributed payment processing system 102 may have its own distinct payment processing behaviors at runtime in terms of, for non-limiting examples, latencies/timings, synchronous/asynchronous, and error-handling capabilities, when it processes a major stage (e.g., capture) of the payment process in a processor-specific manner. As a result, the payment sub-graph utilized by the electronic payment processing engine/processor 106 is further specialized to be a processor-specific sub-graph for interactions specifically with the payment processing engine/processor 106.

Upon receiving a payment request (e.g., to process a credit card payment) from a client device 110, the distributed payment processing system 102 is configured to process the electronic payment through various stages in the payment processing lifecycle. Each of the main payment processing engine 105 and the electronic payment processing engines 106 is configured to process the electronic payment based on types of states, edges, and attributes of the edges in its associated main payment graph and the payment sub-graphs, respectively, while traversing through the states and edges in the payment graphs based on processing results at each of the states. Here, the payment may only transition from one state to another if there is an edge between them and a precondition/guard on the edge is met by the processing results.

The first stage of the payment lifecycle is "validation" or "authorization" (in case of credit card payment). As shown by the payment graph of FIG. 2 and the authorization sub-graph 304 in FIGS. 3A and 3B, the only valid input state to the authorization stage is NEW/A_NEW. Thus, if the electronic payment processing engine/processor 106 in charge of the authorization stage processing is provided as its input a payment request that is not in state NEW, such payment request fails to satisfy the preconditions of the electronic payment processing engine/processor 106 for the authorization stage. As a result, the payment request is not authorized by the electronic payment processing engine/processor 106 and will not be processed further. At each stage of the payment processing lifecycle, each of the main payment processing engine 105 and the electronic payment processing engines 106 also checks its associated main payment graph or payment sub-graph to determine the entire set of possible (legal) outcomes of the stage. For a non-limiting example, it would be impossible for a payment processing request to come in as NEW and somehow end up in the state of REVIEW_PENDING at the authorization stage of the payment processing.

In some embodiments, the main payment graph and/or the payment sub-graphs associated with the payment processing engines not only define the state transition within the said (sub-)graph, it also defines when the main payment processing engine 105 should communicate and hand off a specific stage of payment processing to an electronic payment processing engine 106 and vice versa. Such inter-graph communication is modeled or typed via an extended graph definition language (GDL) and applies to both parent-child (e.g., the main payment processing engine 105 handing off to the electronic payment processing engine 106) and child-parent notifications (e.g., the electronic payment processing engine 106 notifying the main payment processing engine 105 of payment processing result at a specific stage). In some embodiments, the main payment processing engine 105 associated with the main payment graph 302 is configured to communicate with the electronic payment processing engines 106 associated with the payment sub-graphs 304 via well-defined communication points to ensure seamless integration and robust recovery in face of failures.

In some embodiments, the main payment graph and/or the payment sub-graphs associated with the payment processing engines also define error handling and recovery strategies of the payment processing lifecycle. In some embodiments, the error handling transition can kick-off event propagation so that the main payment processing engine 105 associated with the main (parent) graph is notified when an electronic payment processing engine 106 associated with a sub-graph has entered an ERROR state. The main payment processing engine 105 is then configured to determine the next step based on the input (event=ERROR), the current state, and the set of successors of the current state.

At all stages of the payment lifecycle, the payment graph datastore 108 is continuously updated in real time so that it maintains the latest states and state transitions through the instance of the payment graph at all times by the distributed payment processing system 102. After the processing is done, the distributed payment processing system 102 is configured to provide the processing result of the electronic payment back to the client device 110.

In some embodiments, the distributed payment processing system 102 is configured to automatically record and build an audit trail for the electronic payment (as well as all electronic payments concurrently being processed online by the system 100) based on the updated states and state transitions in the payment graph datastore 108 for real time or future analysis. As discussed above, the audit trail is a path from one payment state to another that includes a plurality of vertices connected by directed edges in the hierarchical payment graph, wherein the audit trail includes different types of attributes (payloads) recorded along the path for risk analysis. The audit trail is the sum total of recorded state transitions for the electronic payment with all state transitions fully accounted for. For a non-limiting example, the following table reflects an audit trail for electronic payment with payment_id=1000, wherein each row describes a transition from state src to state dst via an edge and each of the entities (V/E) is typed accordingly. Note that a state transition may also contain payload of the edge (not included in this example).

| id | payment_id | src | dst | edge |
| --- | --- | --- | --- | --- |
| 2620 | 1000 | NEW | PRE_AUTHORIZED | NETWORK_AUTHORIZED |
| 2621 | 1000 | PRE_AUTHORIZED | AUTHORIZED | FINALIZE_CARD_ACCEPT |
| 2622 | 1000 | AUTHORIZED | CAPTURED | SYSTEM_CAPTURED |

Given the recorded state transitions, the distributed payment processing system 102 is configured to re-create the complete audit trail of any payment in the system 100. If the processing of an electronic payment by the distributed payment processing system 102 fails at any given point, the payment graph datastore 108 is not adversely affected and a subsequent restart of the processing of the electronic payment by the distributed payment processing system 102 only needs to pick up the last valid state of the electronic payment based on its audit trail from the payment graph datastore 108 and to continue processing the electronic payment without a hitch.

Figure 4:
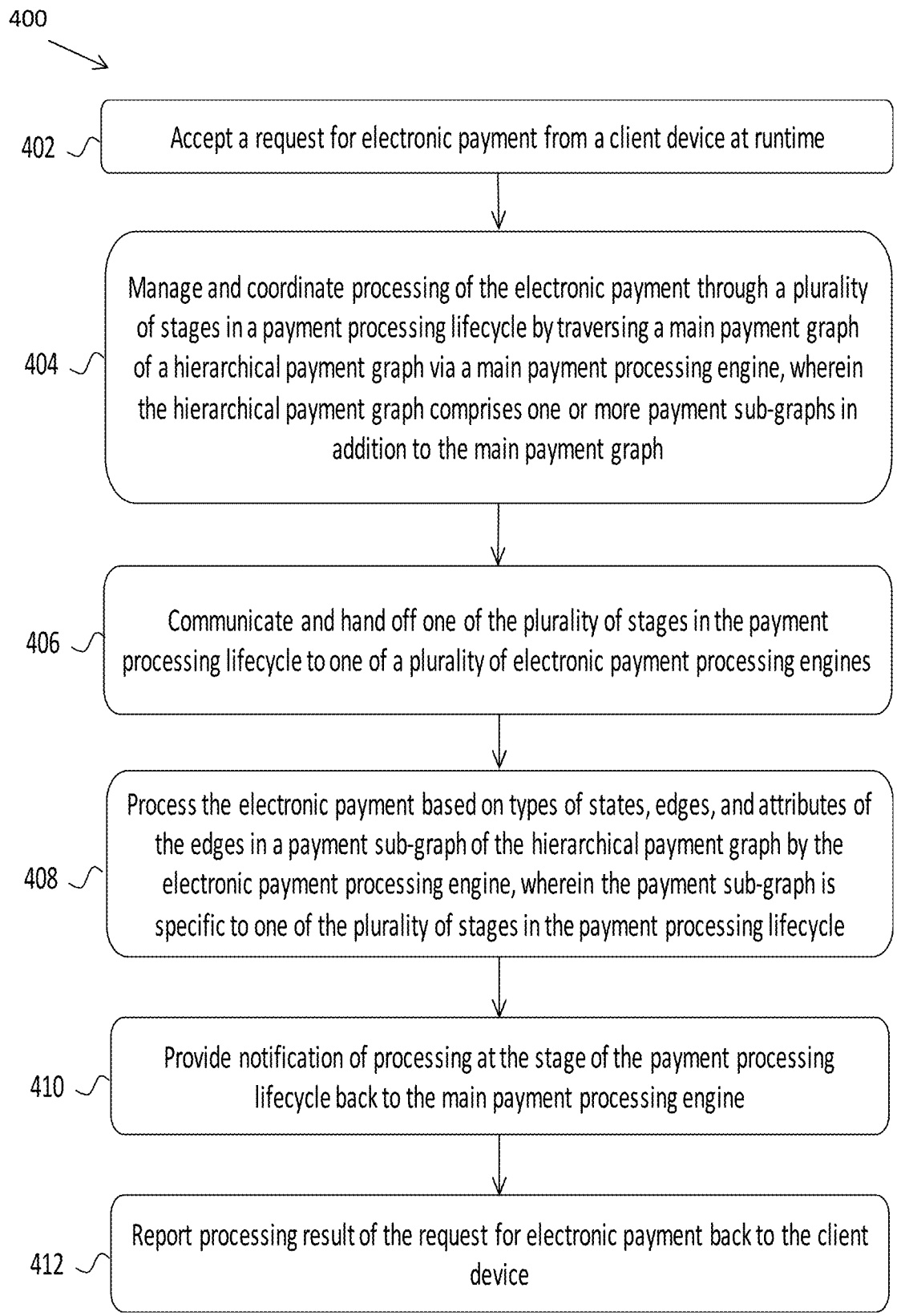
FIG. 4 depicts an example of a flowchart of a process to support distributed electronic payment processing in accordance with some embodiments.

FIG. 4 depicts an example of a flowchart of a process to support distributed electronic payment processing. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a request for electronic payment from a client device is accepted at runtime. The flowchart 400 continues to block 404, where processing of the electronic payment through a plurality of stages in a payment processing lifecycle is managed and coordinated by traversing a main payment graph of a hierarchical payment graph via a main payment processing engine, wherein the hierarchical payment graph comprises one or more payment sub-graphs in addition to the main payment graph. The flowchart 400 continues to block 406, where one of the plurality of stages in the payment processing lifecycle is handed off to one of a plurality of electronic payment processing engines. The flowchart 400 continues to block 408, where the electronic payment is processed based on types of states, edges, and attributes of the edges in a payment sub-graph of the hierarchical payment graph by the electronic payment processing engine, wherein the payment sub-graph is specific to one of the plurality of stages in the payment processing lifecycle. The flowchart 400 continues to block 410, where notification of processing at the stage of the payment processing lifecycle is provided back to the main payment processing engine. The flowchart 400 ends at block 412, where processing result of the request for electronic payment is reported back to the client device.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support distributed electronic payment processing, comprising:
   a main payment processing engine running on a host including a first memory storing instructions, a first processor configured to read the instructions, and a payment graph datastore, wherein the main payment processing engine is implemented by the processor and configured to:
   accept a request to process an electronic payment from a client device at runtime;
   load a hierarchical payment graph from the payment graph datastore, wherein the hierarchical payment graph is selected based on the electronic payment;
   traverse a main payment graph of the hierarchical payment graph, wherein the hierarchical payment graph comprises one or more payment sub-graphs in addition to the main payment graph, and wherein traversal of the main payment graph processes the electronic payment through a plurality of stages in a payment processing lifecycle;
   provide one of the one or more payment sub-graphs associated with one of the plurality of stages in the payment processing lifecycle to a corresponding one of a plurality of electronic payment processing engines;
   store, in the payment graph datastore, updated states and state transitions of the main payment graph or the one or more payment sub-graphs, wherein the updated states and state transitions are configured to allow the main payment processing engine to restart processing of the electronic payment at any node in the hierarchical payment graph; and
   report a processing result of the request for electronic payment back to the client device; and
   the plurality of electronic payment engines each running on one or more other hosts each including a second memory storing instructions and a second processor, wherein the plurality of electronic payment engines are each configured to:
   process the electronic payment at a stage of the payment processing lifecycle based on types of states, edges, and attributes of the edges in the one of the one or more payment sub-graphs of the hierarchical payment graph; and
   provide a notification of a processing result of the stage of the payment processing lifecycle to the main payment processing engine,
   wherein the main payment processing engine and the plurality of electronic payment engines are communicatively coupled such that processing of the electronic payment is coordinated to enable recovery of at least one independent processing engine failure.

2. The system of claim 1, wherein:
   one or more of the main payment processing engine and the electronic payment engines are at geographically distributed locations.

3. The system of claim 1, wherein:
   a parent-child relationship is maintained between the main payment graph and the payment sub-graphs of the hierarchical payment graph.

4. The system of claim 1, wherein:
the main payment graph is decoupled from details of the state transitions and error handling of the electronic payment processing, which are covered by the payment sub-graphs.

5. The system of claim 1, wherein:
the main payment graph or the payment sub-graphs define error handling and recovery strategies of the payment processing lifecycle.

6. The system of claim 1, wherein:
the payment sub-graph utilized by an electronic payment processing engine is further specialized to be a processor-specific sub-graph for interactions specifically with the electronic payment processing engine.

7. The system of claim 1, wherein:
each of the main payment processing engine and the electronic payment processing engines is configured to check its associated main payment graph and payment sub-graph to determine a set of outcomes at each stage of the payment processing lifecycle.

8. The system of claim 1, wherein:
inter-graph communication between the main payment processing engine and the plurality of electronic payment engines is modeled via an extended graph definition language (GDL).

9. The system of claim 1, wherein:
the distributed payment processing system is configured to automatically generate an audit trail for the electronic payment based on its updated states and transitions for real time or future analysis, wherein the audit trail is a path that includes a plurality of states connected by directed edges from one payment state to another in the hierarchical payment graph, and wherein the audit trail includes different types of attributes recorded along the path for risk analysis.

10. The system of claim 1, wherein:
the distributed payment processing system is configured to check types of states, edges, and attributes of the edges in the hierarchical payment graph for type safety before runtime to prevent errors during processing of the electronic payment.

11. The system of claim 1, further comprising:
a payment graph datastore running on the host, which in operation, is configured to maintain schemas of the hierarchical payment graph, wherein the hierarchical payment graph is continuously updated in real time during processing of the electronic payment so that the payment graph datastore maintains the latest states and transitions of the electronic payment through every stage of the lifecycle.

12. A computer-implemented method to support distributed electronic payment processing, comprising:
accepting a request to process an electronic payment from a client device at runtime;
traversing a main payment graph of a hierarchical payment graph via a main payment processing engine, wherein the hierarchical payment graph comprises one or more payment sub-graphs in addition to the main payment graph, wherein traversing the main payment graph processes the electronic payment through a plurality of stages in a payment processing lifecycle;
providing one of the one or more sub-graphs associated with one of the plurality of stages in the payment processing lifecycle to a corresponding one of a plurality of electronic payment processing engines;
processing the electronic payment at a stage of the payment processing lifecycle based on types of states, edges, and attributes of the edges in the one of the one or more payment sub-graphs of the hierarchical payment graph by the electronic payment processing engine;
providing a notification of a processing result of the stage of the payment processing lifecycle to the main payment processing engine;
storing, in a payment graph datastore, updated states and state transitions of the main payment graph or the one or more payment sub-graphs, wherein the updated states and state transitions are configured to allow the main payment processing engine to restart processing of the electronic payment at any node in the hierarchical payment graph; and
reporting a processing result of the request for electronic payment back to the client device,
wherein the main payment processing engine and the plurality of electronic payment engines are communicatively coupled such that processing of the electronic payment is coordinated to enable recovery of at least one independent processing engine failure.

13. The computer-implemented method of claim 12, wherein:
one or more of the main payment processing engine and the electronic payment engines are at geographically distributed locations.

14. The computer-implemented method of claim 12, wherein:
one or both of the main payment graph or the payment sub-graphs define error handling and recovery strategies of the payment processing lifecycle.

15. The computer-implemented method of claim 12, further comprising:
decoupling the main payment graph from details of the state transitions and error handling of the electronic payment processing, which are covered by the payment sub-graphs.

16. The computer-implemented method of claim 12, wherein the payment sub-graph corresponds to a specific electronic payment processing engine configured to process interactions specifically for the payment sub-graph.

17. The computer-implemented method of claim 12, further comprising:
checking the main payment graph or the payment sub-graphs associated with each of the main payment processing engine and the electronic payment processing engines to determine a set of outcomes at each stage of the payment processing lifecycle.

18. The computer-implemented method of claim 12, further comprising:
modeling inter-graph communication between the main payment processing engine and the plurality of electronic payment engines via an extended graph definition language (GDL).

19. The computer-implemented method of claim 12, further comprising:
automatically generating an audit trail for the electronic payment based on its updated states and transitions for real time or future analysis, wherein the audit trail is a path that includes a plurality of states connected by directed edges from one payment state to another in the hierarchical payment graph, and wherein the audit trail includes different types of attributes recorded along the path for risk analysis.

20. The computer-implemented method of claim 12, further comprising:

checking types of states, edges, and attributes of the edges in the hierarchical payment graph for type safety before runtime to prevent errors during processing of the electronic payment.

21. The computer-implemented method of claim 12, further comprising:

maintaining schemas of the hierarchical payment graph in a payment graph datastore, wherein the hierarchical payment graph is continuously updated in real time during processing of the electronic payment so that the payment graph datastore maintains the latest states and transitions of the electronic payment through every stage of the lifecycle.

22. A non-transitory computer readable storage medium having software instructions stored thereon that when executed cause a system to:

accept a request to process an electronic payment from a client device at runtime;

traverse a main payment graph of a hierarchical payment graph via a main payment processing engine, wherein the hierarchical payment graph comprises one or more payment sub-graphs in addition to the main payment graph, and wherein traversing the main payment graph processes the electronic payment through a plurality of stages in a payment processing lifecycle;

provide one of the one or more payment sub-graphs associated with one of the plurality of stages in the payment processing lifecycle to a corresponding one of a plurality of electronic payment processing engines;

process the electronic payment at a stage of the payment processing lifecycle based on types of states, edges, and attributes of the edges in the one of the one or more payment sub-graphs of the hierarchical payment graph by the electronic payment processing engine;

provide a notification of a processing result of the stage of the payment processing lifecycle to the main payment processing engine;

store, in a payment graph datastore, updated states and state transitions of the main payment graph or the one or more payment sub-graphs, wherein the updated states and state transitions are configured to allow the main payment processing engine to restart processing of the electronic payment at any node in the hierarchical payment graph;

report a processing result of the request for electronic payment back to the client device, wherein the main payment processing engine and the plurality of electronic payment engines are communicatively coupled such that processing of the electronic payment is coordinated to enable recovery of at least one independent processing engine failure.

\* \* \* \* \*